United States Patent [19]

Dybus et al.

[11] Patent Number: 5,296,040
[45] Date of Patent: Mar. 22, 1994

[54] PROCESS FOR CLEANING DEBRIS CONTAINING POLLUTANTS

[75] Inventors: Herbert Dybus, Essen; Otto Funk, Dorsten, both of Fed. Rep. of Germany

[73] Assignee: Ruhrkohle Oel und Gas GmbH, Bottrop, Fed. Rep. of Germany

[21] Appl. No.: 842,913

[22] Filed: Feb. 28, 1992

[30] Foreign Application Priority Data

Feb. 28, 1991 [DE] Fed. Rep. of Germany ....... 4106281

[51] Int. Cl.$^5$ .................... B08B 3/00; B08B 3/08
[52] U.S. Cl. .................... 134/25.1; 134/12; 134/21; 134/26; 134/40
[58] Field of Search ............ 134/12, 21, 25.1, 26, 134/40

[56] References Cited

U.S. PATENT DOCUMENTS

| | | | |
|---|---|---|---|
| 4,606,774 | 8/1986 | Morris | 134/12 |
| 4,793,937 | 12/1988 | Meenan et al. | 423/481 |
| 4,801,384 | 1/1989 | Steiner | 134/25.1 |
| 5,039,380 | 8/1991 | Berg | 585/805 |
| 5,055,196 | 10/1991 | Darian et al. | 134/25.1 |

Primary Examiner—R. Bruce Breneman
Assistant Examiner—Zeinab El-Arini
Attorney, Agent, or Firm—Nils H. Ljungman

[57] ABSTRACT

Process for the cleaning of debris containing water and contaminated with pollutants using solvents, including the steps of: addition of the solvent to the material to be treated, followed by thorough mixing; separation of the liquid phase containing the pollutants; stripping of the remaining solvent from the residue; and recovery of the solvent obtained in the last two steps.

20 Claims, 2 Drawing Sheets

PROCESS FOR CLEANING DEBRIS CONTAINING POLLUTANTS

BACKGROUND OF THE INVENTION

1. Field of the Invention

In general, the present invention relates to a process for cleaning debris, for example, sludge and/or construction debris.

More particularly, the present invention relates to a process for the treatment of materials containing water and contaminated with pollutants, the process using solvents. The inventive process has particular application to the treatment of sludge. However, the process can also be used on soil, sand, construction debris and other solid materials which are contaminated with pollutants.

2. Background Information

There is also a process for the extraction of impurities and toxic substances from soils in an extraction process which is performed on site, in which the material to be treated (i.e., soil) is extracted with non-flammable solvents, and the solvent is then recovered following the treatment by distillation. One disadvantage of this process is its use of certain solvents as extraction solvents, on one hand, because of the known toxicity of these materials, and on the other hand, because a complete removal of the solvents from the treated material cannot be guaranteed.

Using the existing processes, sludge from mining, industrial and commercial applications, have been solidified, primarily by mixing with additives, such as cement, calcium hydroxide or gypsum, and then either disposed of in landfills or used in road construction. However, on account of the high concentration of toxic substances, such disposal is no longer possible. Additionally, there are also bottlenecks in the allowable disposal by thermal means (e.g., incineration).

Due to the fact that space in landfills is becoming increasingly scarce, and in order to eliminate hazards to the environment, interest is currently being focused on processes for the separation of components which contain contaminates. The purpose of these processes is to reduce the volume of the waste and the concentration of the toxic substances, and to reuse, if possible, the purified material. Even in cases where reuse is not possible, the reduction in the volume of waste (e.g., by sludge dehydration and contaminant removal) saves valuable landfill space.

Contaminated materials can come from many diverse sources. For example, one well known source of such materials is the construction industry. Contaminants commonly find their way into the refuse piles on various construction sites. Moreover, the demolition of previously existing structures is an obvious source of materials which may have become polluted with contaminants and which therefore, often require that special precautions be taken in the treatment and disposal of the resultant debris. In particular, the demolition of previous manufacturing facilities often yields a great quantity of debris which is, or may be, contaminated with objectionable contaminants. Such contaminants are the result of the various supplies which are employed as a natural part of many and diverse manufacturing processes.

Still further, many manufacturing facilities, in and of themselves, generate considerable quantities of contaminated debris as a natural course of events in the ongoing manufacturing processes. Such debris is quite often not of such a nature that it is safely disposable without treatment to remove therefrom various contaminants which would be objectionable were the untreated debris to be directly disposed of in an untreated condition, for example, in a landfill.

It is clear that the land available for new landfills is becoming more and more scarce, existing landfill sites are becoming ever more overburdened. Therefore, there is an ever increasing interest in methods and processes which minimize the impact of waste and debris disposal upon the above-noted scarce landfill resources. Additionally, as noted above, there is an ever increasing concern that various contaminants not find their way into landfills, but rather be disposed of by more environmentally correct procedures. The present invention is directed towards addressing both of these concerns.

There is also a process for the extraction of impurities and toxic substances from soils in an extraction process which is performed on site, in which the material to be treated (i.e., soil) is extracted with non-flammable organic solvents, and the solvent is then recovered following the treatment by distillation. One disadvantage of this process is its use of chlorinated hydrocarbons as extraction solvents, on one hand, because of the known toxicity of these materials, and on the other hand, because a complete removal of the chlorinated hydrocarbons from the treated material cannot be guaranteed.

Using the existing processes, sludge containing oil, in particular from oil traps used in mining, industrial and commercial applications, have been solidified, primarily by mixing with additives, such as cement, calcium hydroxide or gypsum, and then either disposed of in landfills or used in road construction. However, on account of the high concentration of toxic substances, such disposal is no longer possible. Additionally, there are also bottlenecks in the allowable disposal by thermal means (e.g., incineration).

Due to the fact that space in landfills is becoming increasingly scarce, and in order to eliminate hazards to the environment, interest is currently being focused on processes for the separation of components containing oil. The purpose of these processes is to reduce the volume of the waste and the concentration of the toxic substances, and to reuse, if possible, the purified material. Even in cases where reuse is not possible, the reduction in the volume of waste (e.g., by sludge dehydration and oil removal) saves valuable landfill space.

Used hydraulic fluids, used oils and the contents of oil traps are types of waste which are commonly created in the coal mining industry and which must be disposed of. The waste substances contaminated with PCB/PCDM are normally separated in chemical-physical treatment facilities into a sludge, oil and water phase, which is reprocessed separately, in a so-called three-phase decanter. The end products are oil (contaminated by PCB/PCDM) for high temperature combustion, purified waste water and sludge (containing PCB/PCDM), which is normally solidified by the admixture of additives, for disposal in underground waste dumps.

Polychlorinated biphenyls (PCBS) and diphenylmethanes (PCDM) are synthetic oils which are particularly suitable for use in mining applications on account of their characteristics (they have very low flammability). After the entry into force of the Second PCB Guidelines in July of 1986, hydraulic fluids containing PCBs were replaced by PCDM (also called "HFD"), and other aqueous hydraulic fluids (e.g., HFA and HFC) not containing any PCB/PCDM. In spite of multiple changes and replacements of the hydraulic fluids containing PCBs during customary repair and maintenance activities, the oil destined for disposal may still contain residual concentrations of more than 100 ppm of these substances. Oils containing PCB are also encountered during the maintenance and cleaning of hydraulic equipment and machines, and in the disposal of large quantities of motor oil, and are therefore frequently also found in the oil traps of gasoline stations and vehicle repair shops.

The requirements for the residual oils concentration in waste which is to be dumped in landfills is certain to become stricter in the future, and corresponding rules regarding waste disposal are being prepared. To protect the waste disposal concept, for which it is essential, in the long term, that the residues be certified for disposal, attempts have therefore been made to find suitable treatment processes which will remove as much of the oil-containing components as possible. The present inventors have discovered that, by using the conventional washing processes, which work primarily with water and with the addition of surfactant substances (tensides), or with steam, it is extremely difficult, if not impossible, to achieve a sufficient separation of oil from the solids. This fact is believed to be due, on one hand, to the quality of the oil (high boiling point, non-volatility), and, on the other hand, to the high bonding forces between oil and solid, which cannot be sufficiently eliminated by the water treatment.

OBJECT OF THE INVENTION

An object of the present invention is, accordingly, to make available a process of the type described above, by means of which an essentially complete removal of organic pollutants from the material to be treated can be ensured, whereby a solid residue is obtained which can be disposed of in a landfill, reused or reprocessed, and wherein the separated organic pollutant occurs in an essentially isolated and concentrated form for the further disposal thereof.

SUMMARY OF THE INVENTION

One aspect of the invention resides broadly in a treatment process for the decontamination of a contaminated material, the contaminated material being contaminated with a pollutant, and the contaminated material also containing water, the treatment process comprising the steps of: adding a solvent to the contaminated material; mixing said added solvent with the contaminated material to produce a mixture of a liquid phase and a solid phase; separating the liquid phase from the solid phase to thereby produce a separated solid residue and a first recovered portion of the liquid phase, the separated solid residue still containing a residual amount of the liquid phase; and subjecting the separated solid residue still containing a residual amount of the liquid phase to a further recovery treatment to thereby recover a substantial portion of the residual amount of the liquid phase as a second recovered portion of the liquid phase, the solid residue remaining after the further treatment comprising a disposable solid portion.

The object presented above and other objects are further achieved by means of a process of the type described herein, which process includes the following steps e.g.:

i.e., addition of the organic solvent to the material to be treated, followed by thorough mixing;
separation of the liquid organic phase containing the pollutants;
stripping of the remaining solvent from the residue from the previous step; and
recovery of the solvent obtained in the final two above steps.

In contrast to the water/steam treatment discussed above, an extraction using organic solvents which are immiscible with water is able to separate the oil from the solids that is commonly encountered in oil trap sludge, either essentially or substantially completely. If, on account of the fine grain of the sludge (for example, particle sizes less than 200 fm), it is not possible to achieve sufficient filtering capability, the solid/liquid separation (e.g., the mechanical separation step) may be achieved by a decanting step, after the solids have settled out of the mixture. The filter residue containing the major part of the water can then be solidified by drying, or by the addition of additives. The decanted liquid contains suspended materials which did not sink, and which, on account of the differences in boiling points, can be reprocessed by distillation into solvents and the residue containing oil with a low proportion of solids. If necessary, the extraction of the solid matter can be repeated.

Preferably, however, the water present in the material is azeotropically distilled with the solvent. The water-free residue containing the excess solvent can then generally be filtered with good results. At the end of the treatment, a solid residue is obtained which is completely free of water and oil, and which can be safely disposed of without further treatment (solidification by drying and/or by the addition of additives). After the solvent has been stripped off, the extracted pollutants are obtained in concentrated form. Therefore, thermal disposal is easily accomplished or, in the case of oil, hydrogenation of the oil obtained from the process.

In general, the invention features a treatment process for the decontamination of a contaminated material, the contaminated material being contaminated with an organic pollutant, and the contaminated material also containing water, said treatment process including the steps of: adding an organic solvent to the contaminated material, said organic solvent being immiscible with water; mixing said added organic solvent with the contaminated material to produce a mixture of a liquid phase and a solid phase; separating said liquid phase from said solid phase to thereby produce a separated solid residue and a first recovered portion of said liquid phase, said separated solid residue still containing a residual amount of said liquid phase; and subjecting to a further recovery treatment said separated solid residue still containing a residual amount of said liquid phase to thereby recover a substantial portion of said residual amount of said liquid phase as a second recovered portion of said liquid phase, said solid residue remaining after said further treatment comprising a disposable solid portion.

BRIEF DESCRIPTION OF THE DRAWINGS

A preferred process according to the invention is explained in greater detail with reference to the accompanying figures, wherein.

DESCRIPTION OF THE PREFERRED EMBODIMENTS

Figure 1:
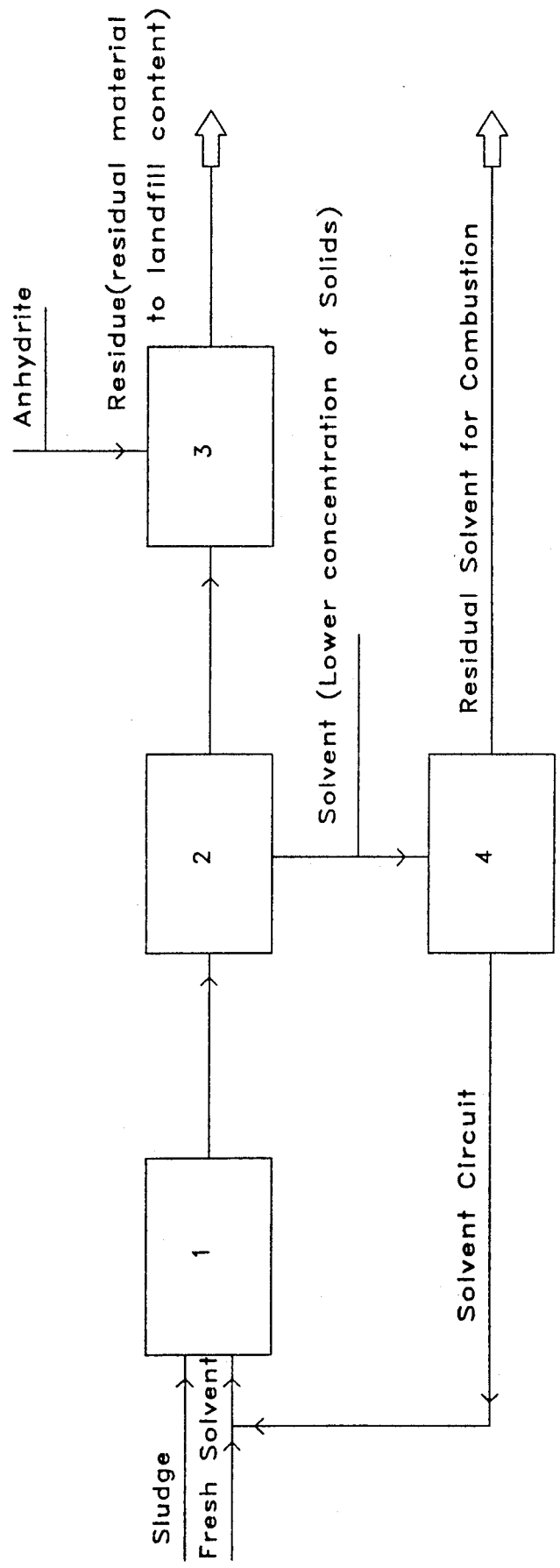
FIG. 1 is a flow chart showing one preferred embodiment of a process according to the invention, wherein the water remaining in the solid matter is bound by an anhydrite.

The particularly preferred organic solvents which are immiscible with water and which are used in the process according to the invention are those which preferably have a boiling point/boiling range which is far below that of the oil or other pollutants contained in the sludge. Preferably, the solvents used are hydrocarbons with a boiling point from about 60 to about 200° C. in particular from about 80 to about 160 degrees C. Particularly preferred solvents are toluene and xylene, which have significant water entrainment properties, as well as a hydrocarbon fraction with a boiling range of from about 80 to about 160° C. ("Syncrude Fraction 80-160"). Other organic solvents can also be used, e.g., aliphatic hydrocarbons with a suitable boiling point or boiling range, such as petroleum ether.

In the process according to the invention, the solid to solvent weight ratio is preferably approximately 1:1 to approximately 1:5, and most preferably about 1:2 to about 1:3. The latter ratio is used, in particular as the water is stripped off by azeotropic distillation. It has been discovered that one extraction step generally suffices in the case of the azeotropic separation of the water present in the material to be treated, but several extraction steps can also be performed. If the water is not removed by azeotropic distillation, several extraction steps may be necessary to sufficiently reduce the pollutant content.

In the extraction step, the solvent fraction is separated from the solid residue. That can be done by either filtration or decanting. If, before the extraction, the water is azeotropically separated, easy filtration is generally possible. If not, it is possible to allow the solid residue to settle and then perform a decanting.

Processes and apparatus for filtering and/or separation are disclosed in U.S. Pat. No. 4,793,937, issued on Dec. 27, 1988 and entitled "Method and Apparatus for Separating Contaminants from Fluidizable Solids"; in U.S. Pat. No. 4,699,721, issued on Oct. 13, 1987 and similarly entitled; and in U.S. Pat. No. 4,954,267, issued on Sep. 4, 1990 and entitled "Hydrocarbon Reclaimer System".

Azeotropic distillation processes are well known in the art and are discussed, for example, in U.S. Pat. No. 5,039,380, issued on Aug. 13, 1991 and entitled "Separation of M-Xylene from P-Xylene or O-Xylene by Azeotropic Distillation"; in U.S. Pat. No. 4,186,059, issued on Jan. 29, 1980 and entitled "Dehydration of Solvent Used in Oil Dewaxing - Deoiling Processes"; and in U.S. Pat. No. 4,514,305, issued on Apr. 30, 1985 and entitled "Azeotropic Dehydration Process for Treating Bituminous Froth".

After the extraction has been completed, the solid residue 4-s preferably freed of any solvent which then remains, e.g., by blowing air through it, heating and/or evaporating it in a vacuum. Most preferably, this step is accomplished by a slight heating in a vacuum.

If, after the extraction and the stripping of the residual solvent, the solid residue remaining still contains some water, the residue is then preferably mixed with a water-binding additive and solidified. Cement, gypsum, hydrated lime or anhydrite, for example, are suitable for this purpose.

The process according to the invention makes possible the recovery and reuse of the solvent which is obtained in the individual distillation and extraction steps. For that purpose, the contaminated solvent which is obtained during the extraction is separated by a distillation step, which can be done easily on account of the great difference in boiling points between the solvent and the organic pollutants. Additionally the organic solvent obtained from the azeotropic distillation can be quite easily separated from the aqueous phase, on account of its immiscibility in water.

The solid residue obtained in the process according to the invention, after solidification, can be disposed of without further treatment in a landfill, but the solid residue can also be safely used for other purposes, since the concentration of organic pollutants is extraordinarily low. After the solvent has been stripped, the pollutants extracted therefrom are obtained in an extremely concentrated form, which facilitates their further processing. They can be disposed of without further processing. Moreover, in the case of contaminated oils, the hydrogenation of the recovered oils is also possible.

Oil hydrogenation processes are disclosed in U.S. Pat. No. 4,123,349, issued on Oct. 31, 1978 and entitled "Separation of Solids Containing Residues from Liquid Fractions of a Coal Hydrogenation Process Using an Expansion Engine and a Pressure Release Means"; and in U.S. Pat. No. 4,810,365, issued on Mar. 7, 1989 and entitled "Hydrogenation of Mineral Oils Contaminated with Chlorinated Hydrocarbons".

The process according to the invention is particularly suited for the treatment of decanting sludge containing oil and contaminated with PCB/PCDM. It can also be used, however, for the purification of soils (e.g., sand, clay, coarse clay or mixtures thereof), construction debris, sludge, chemical toxic waste, shredder waste, etc. All the substances which are soluble in the organic solvent employed can be extracted, in particular oils and greases, aliphatic and aromatic hydrocarbons, TAK, phenols, PCB, chlorinated hydrocarbons, pesticides, insecticides, etc. For the recovery of the solvent, however, one prerequisite is that there be a significantly high difference in boiling points between the extraction medium (i.e., the solvent) and the pollutant to be extracted.

To increase the effectiveness of the extraction and/or to accelerate the process, the process can also be performed at an elevated temperature. If the extraction is performed several times, solvents of different degrees of purity can be processed, whereby previously used but decontaminated solvents can be used in the first extraction steps, and clean (or fresh) solvent in the later steps.

The process according to the preferred embodiment illustrated in FIG. 1 consists essentially of the following steps:

(1) Treatment of the decantation sludge in an agitator tank with an excess of special organic solvents which are immiscible with water (the solid to solvent ratio being approximately 1:2 to approximately 1:3), under constant agitation at room temperature or at elevated temperature, but below the boiling point of the solvent;

(2) After the solids have settled out, decanting (or separation by filtering) of the organic liquid phases;

(3) In the treatment of the residue, elimination of the remaining solvent, and elimination of some to all of the adhering water, with partial elimination of the water, and/or binding of the residual water through the addition of additives such as anhydrite, and (4) Distillation;

The decanted fluid with a low concentration of solid matter contains the solvent/oil mixture, from which the solvent can be recovered almost completely.

Figure 2:
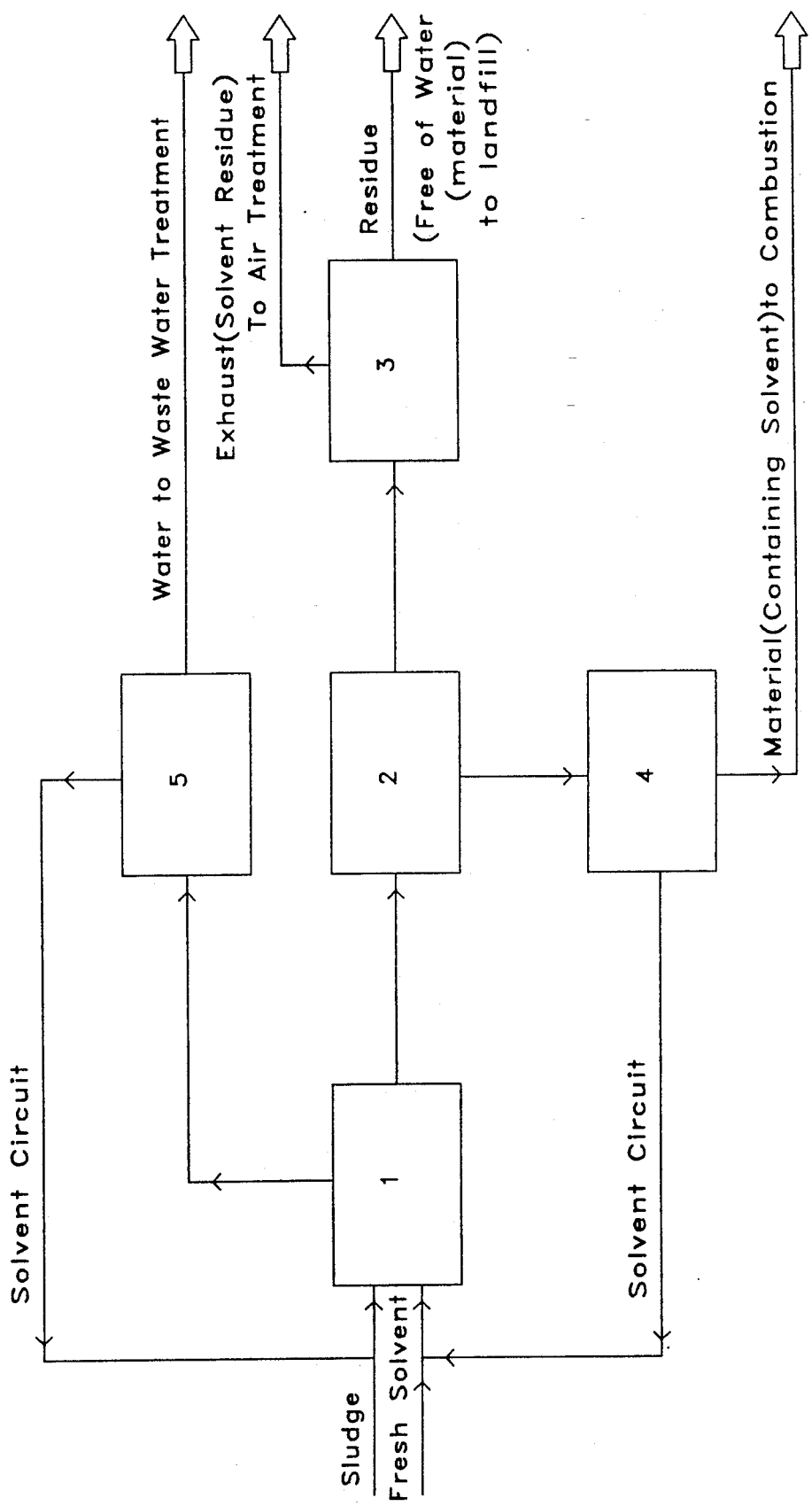
FIG. 2 is a flow chart showing an additional preferred embodiment of the process according to the invention, in which the water contained in the material to be treated is azeotropically distilled off.

The particularly preferred process variant illustrated in FIG. 2 consists essentially of the following steps:

(1) Water separation by azeotropic distillation with preferably aromatic solvents in the boiling range between about 80 and about 160° C.;

| e.g., toluene | 110 degrees C. |
|---|---|
| xylene | 92 degrees C. |
| Syncrude Fraction | 80–160 degrees C. |

The preferred boiling points of the azeotropic mixture are:

| e.g., toluene/$H_2O$ | 84 degrees C. |
|---|---|
| xylene/$H_2O$ | 92 degrees C. |

(2) Filtration. The removal of the water leaves an easily filterable suspension of the solid matter in organic phase. A washing of the filter residue with fresh solvent or with a volatile hydrocarbon/hydrocarbon mixture facilitates a subsequent;

(3) Treatment of the residue with heat in a vacuum for the total elimination of any remaining traces of solvent. The residue can be disposed of without the further admixture of additives.

(4) Distillation. The filtrate from 2 contains the solvent/oil mixture, from which the solvent can be recovered completely.

(5) Water separation. The solvent phase, together with the solvent recovered from the distillation, makes up the major portion. Losses during the distillation 4 and the solvent/water separation 5 are made up by the addition of fresh solvent.

WORKING EXAMPLES

The invention is now explained in greater detail with reference to the following working examples:

WORKING EXAMPLES 1 to 5

A treatment was performed, on the laboratory scale, of a decanter sludge having the following approximate composition:

| Water | 25.5 wt. % |
|---|---|
| Oil | 15.2 wt. % |
| Solids | 59.3 wt. % |

The treatment was performed according to the process variants described with reference to the accompanying FIGS. 1 and 2 and produced the following residual oil concentrations in the solid residue:

| Solvent | | Process | Residual Oil Content |
|---|---|---|---|
| Petroleum ether | 40–70 degrees C. | 1 | 1.5 |
| Ligroine | 100–140 degrees C. | 1 | 1.1 |
| Toluene | | 1 | 1.1 |
| Xylene | | 2* | 0 |
| Syncrude Fraction | 80–160 degrees C. | 2* | 0 |

*Variant with azeotropic distillation as illustrated in FIG. 2.

In summary, one feature of the invention resides broadly in a treatment process for the treatment of materials containing water and contaminated with organic pollutants using volatile organic solvents which cannot be mixed with water, characterized by the following steps: (a) Addition of the organic solvent to the material to be treated, followed by thorough mixing; (c) Separation of the liquid organic phase containing the pollutants; (d) Stripping of the remaining solvent from the residue from step (c), and (e) Recovery of the solvent obtained in steps (c) and (d).

Another feature of the invention resides broadly in a treatment process as above, characterized by the fact that the organic solvent used is one which forms an azeotrope with water, that the water present in the material is distilled off in a step (b), and that the solvent thereby obtained is separated and recycled.

Yet another feature of the invention resides broadly in a treatment process as above, characterized by the fact that in a step (t), the water remaining in the solid residue is bonded by the admixture of a water-binding additive.

A further feature of the invention resides broadly in a treatment process as above, characterized by the fact that cement, hydrated lime or anhydrite is used as the water-binding additive.

A yet further feature of the invention resides broadly in a treatment process as above, characterized by the fact that the remaining solvent in step (d) is stripped oft in the presence of heat and/or in a vacuum.

Yet another further feature of the invention resides broadly in a treatment process as above, characterized by the fact that the solvent used has a boiling point from 60 degrees C to 200 degrees C, preferably from 80 degrees C. to 160 degrees C.

An additional feature of the invention resides broadly in a treatment process as above, characterized by the fact that toluene, xylene or a hydrocarbon fraction is used as the solvent.

A yet additional feature of the invention resides broadly in a treatment process as above, characterized by the fact that the solid:solvent weight ratio is in the range of 1:1 to 1:5, preferably 1:2 to 1:3.

A further additional feature of the invention resides broadly in a treatment process as above, characterized by the fact that steps (a) and (c) are repeated at least once.

A yet further additional feature of the invention resides broadly in a treatment process as above, characterized by the fact that step (a) is performed at elevated temperature.

Another further additional feature of the invention resides broadly in a treatment process as above, characterized by the fact that oil trap sludge are used as the contaminated material.

A yet another additional feature of the invention resides broadly in a treatment process as above, characterized by the fact that the material used contains PCB and/or PCDM.

Another yet further feature of the invention resides broadly in a treatment process as above, characterized by the fact that the material to be treated is soil contaminated with oil.

A still further feature of the invention resides broadly in a treatment process as above, characterized by the fact that the solid residue obtained in step (d), after drying or chemical bonding of the water still contained in it if necessary, is solidified for disposal in a landfill.

The present invention relates to a process for the treatment of materials containing water and contaminated with organic pollutants, the process using volatile organic solvents which are immiscible with water. In particular, the inventive process has particular application to the treatment of oil- trap sludge containing PCBs and/or PCDMS. However, the process can also be used on soil, sand, construction debris and other solid materials which are contaminated with organic pollutants, e.g., oil.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A treatment process for the decontamination of a contaminated material, the contaminated material being contaminated with a pollutant, and the contaminated material also containing water, said treatment process comprising the steps of:
   adding a liquid to the contaminated material, the liquid consisting of a water immiscible solvent for dissolving the pollutant, the pollutant being soluble in the solvent;
   mixing said added solvent with the contaminated material to produce a mixture of a liquid phase and a solid phase, the liquid phase containing solvent, water and a substantial portion of the pollutant;
   separating a portion of said liquid phase containing the substantial portion of the pollutant from said solid phase to thereby produce a separated solid residue and a first recovered portion of said liquid phase, said separated solid residue still containing a residual amount of said liquid phase; and
   subjecting said separated solid residue still containing a residual amount of said liquid phase to a further recovery treatment to thereby recover a substantial portion of said residual amount of said liquid phase as a second recovered portion of said liquid phase, said solid residue remaining after said further treatment comprising an environmentally safely disposable solid portion.

2. The treatment process according to claim 1, wherein said solvent is of a type that forms an azeotrope with water, and wherein said treatment process further comprises the additional step of, following said step of mixing said added solvent with the contaminated material to produce said liquid phase and solid phase mixture, subjecting said liquid phase and solid phase mixture to an azeotropic distillation step to thereby distill off an azeotrope fraction from said liquid phase and solid phase mixture, said azeotrope fraction containing a substantial portion of the water in a solvent-water azeotrope, and said liquid phase in said liquid phase solid phase mixture, after said azeotropic distillation, containing substantially solvent.

3. The treatment process according to claim 2, said process further comprising the additional step of combining said substantially safely disposable solid portion with a water binding additive.

4. The treatment process according to claim 3, wherein:
   said water binding additive comprises a member chosen from the group consisting of: cement, gypsum, hydrated lime and anhydrite;
   said separating comprises mechanically separating the solid residue from the first recovered liquid portion; and
   said further recovery treatment comprises subjecting said mechanically separated solid residue to a process for removing a substantial portion of said residual amount of said liquid phase, said process being chosen from the group consisting of:
   passing air through said mechanically separated solid residue;
   heating said mechanically separated solid residue;
   evaporating said substantial portion of said residual amount of said liquid phase from said mechanically separated solid residue;
   heating said mechanically separated solid residue under vacuum; and
   evaporating said substantial portion of said residual amount of said liquid phase from said mechanically separated solid residue under vacuum.

5. The treatment process according to claim 4, wherein said solvent has a boiling point of from about 60° C. to about 200° C.

6. The treatment process according to claim 5, wherein:
   said solvent has a boiling point of from about 80° C. to about 160° C.;
   said solvent comprises an organic solvent;
   the pollutant is more soluble in the organic solvent than in water; and
   said boiling point of said solvent is less than a boiling point of the pollutant.

7. The treatment process according to claim 6, wherein said solvent comprises a member chosen from the group consisting of: toluene, xylene, ligroine and a hydrocarbon fraction.

8. The treatment process according to claim 7, wherein the weight ratio of said solid phase of said mixture to said added solvent is in the range of from about 1:1 to about 1:5.

9. The treatment process according to claim 8, wherein:
   the weight ratio of said solid phase of said mixture to said added solvent is in the range of from about 1:2 to about 1:3;
   the following said steps are repeated at least once:
   adding said solvent to the contaminated material, mixing said added solvent with the contaminated material to produce a mixture of a liquid phase and a solid phase, and mechanically separating said liquid phase from said solid phase; and the following said steps are carried out at an elevated temperature: adding said solvent to the contaminated material, and mixing said added solvent with the contaminated material to produce a mixture of a liquid phase and a solid phase, said elevated temperature being less than said boiling point of said solvent.

10. The treatment process according to claim 9, wherein:

said pollutant substantially comprises a member chosen from the group consisting of: oil, grease, aliphatic hydrocarbons, aromatic hydrocarbons, phenole, chlorinated hydrocarbons, pesticides, insecticides, TAK, PCB and PCDM;

said process further comprises the additional steps of:
solidifying said substantially safely disposable solid portion, and disposing of said solidified substantially safely disposable solid portion in a landfill;
separating, by distillation, said solvent, said water and the pollutants from one of:
said first recovered portion of said liquid phase; and
the azeotrope fraction;
reusing said separated solvent for treating additional polluted material;

said mechanical separation of said liquid phase from said solid phase comprises one of:
filtering the solid phase out of the liquid phase; and
decanting the liquid phase off of the solid phase;
said filtering further comprising washing the filtered solid phase with solvent; and the contaminated material comprises one of:
sludge;
construction debris;
manufacturing debris;
soil;
sand;
oil trap sludge; and
soil contaminated with oil.

11. The process according to claim 1, wherein:
said solvent consists of an organic solvent;
the pollutant is more soluble in the organic solvent than in water; and
said boiling point of the solvent is less than a boiling point of the pollutant, the boiling point of the solvent being in a range of from about 60° C. to about 200° C.

12. The treatment process according to claim 11, wherein:
the solvent consists essentially of a member chosen from the group consisting of: toluene, xylene, ligroine and a hydrocarbon fraction having a boiling point range of from about 80° C. to about 160° C.;
the pollutant substantially comprises a member chosen from the group consisting of: oil, grease, aliphatic hydrocarbons, aromatic hydrocarbons, phenols, chlorinated hydrocarbons, pesticides, insecticides, TAK, PCB and PCDM; and
the material comprises at least one of: sludge, construction debris, manufacturing debris, soil, sand and oil trap sludge.

13. The treatment process according to claim 12, wherein:
said solvent is of a type that forms an azeotrope with water, and said treatment process further comprises the additional step of subjecting said liquid phase and solid phase mixture to an axeotropic distillation step to thereby distill off an azeotrope fraction from said liquid phase and solid phase mixture, said azeotrope fraction containing a substantial portion of the water in a solvent-water azeotrope, and said liquid phase in said liquid phase and solid phase mixture, after said azeotropic distillation, containing substantially solvent;

said process further comprises the additional step of combining said environmentally safely disposable solid portion with a water binding additive, said water binding additive comprising a member chosen from the group consisting of: cement, gypsum, hydrated lime and anhydrite;

said separating comprises mechanically separating the solid residue from the first recovered liquid portion;

said further recovery treatment comprises subjecting said mechanically separated solid residue to a process for removing a substantial portion of said residual amount of said liquid phase, said process being chosen from the group consisting of:
passing air through said mechanically separated solid residue;
heating said mechanically separated solid residue;
evaporating said substantial portion of said residual amount of said liquid phase from said mechanically separated solid residue;
heating said mechanically separated solid residue under vacuum; and
evaporating said substantial portion of said residual amount of said liquid phase from said mechanically separated solid residue under vacuum; and said adding a liquid to the contaminated material comprises adding about 1-5 parts of solvent for each part of said material.

14. A process for decontaminating a material containing water and contaminated with an organic pollutant, said treatment process comprising the steps of:
adding a liquid to the contaminated material, the liquid consisting of an organic solvent for dissolving the organic pollutant, the organic pollutant being soluble in the organic solvent;
mixing said organic solvent with the contaminated material to produce a mixture of a liquid phase and a solid phase, said liquid phase containing at least the organic solvent and a substantial portion of the pollutant;
separating at least a portion of said liquid phase from said solid phase to thereby produce a separated solid residue and a first recovered portion of said liquid phase, said separated solid portion containing a residual amount of said liquid phase; and
subjecting said separated solid residue containing a residual amount of said liquid phase to a further recovery treatment to thereby recover a substantial portion of said residual amount of said liquid phase as a second recovered portion of said liquid phase, said solid residue remaining after said further treatment comprising an environmentally safely disposable solid portion.

15. The treatment process according to claim 14, wherein said process further includes recovering the organic solvent by distiling said first and second recovered portions of said liquid phase to remove the solvent from the pollutant, the pollutant having a boiling point, said solvent having a boiling point, and the boiling point of the solvent being substantially less than the boiling point of the pollutant, whereby the solvent is distilled from the liquid phase.

16. The treatment process according to claim 15, wherein:
the solvent is substantially immiscible with the water;
the solvent is chosen such that the pollutant is more soluble in the solvent than in the water; and
the boiling point of the solvent is between 60° C. to 200° C.

17. The treatment process according to claim 16, wherein:
the boiling point of the solvent is between 80° C. to 160° C.;
the pollutant comprises a member chosen from the group consisting of: oil, grease, aliphatic hydrocarbons, aromatic hydrocarbons, phenols, chlorinated hydrocarbons, pesticides, insecticides, TAK, PCB and PCDM;
the material comprises soil, sand, construction debris and sludge;
the solvent comprises a member chosen from the group consisting of: toluene, xylene, ligroine, and a hydrocarbon fraction having a boiling point between 80° C. and 160° C.;
the solvent forms an azeotrope with water, and wherein said treatment process further comprises the additional step of, following said step of mixing said added solvent with the contaminated material to produce said liquid phase and solid phase mixture, subjecting said liquid phase and solid phase mixture to an azeotropic distillation step to thereby distill off an azeotrope fraction from said liquid phase and solid phase mixture, said azeotrope fraction containing a substantial portion of the water in a solvent-water azeotrope, and said liquid phase in said liquid phase solid phase mixture, after said azeotropic distillation, containing substantially solvent;
said separating said liquid phase from said solid phase comprises one of:
decanting; and
filtering;
said further recovery treatment comprises subjecting said separated solid residue to a process for removing a substantial portion of said residual amount of said liquid phase, said process being chosen from the group consisting of:
passing air through said mechanically separated solid residue;
heating said mechanically separated solid residue;
evaporating said substantial portion of said residual amount of said liquid phase from said mechanically separated solid residue;
heating said mechanically separated solid residue under vacuum; and
evaporating said substantial portion of said residual amount of said liquid phase from said mechanically separated solid residue under vacuum; and
said process further comprises the step of combining said safely disposable solid portion with a water binding additive to bind any residual water therein, said water binding additive comprising a member of the group consisting of:
gypsum, cement, hydrated lime and anhydrite.

18. The process according to claim 14, wherein:
said organic solvent is immiscible with water;
the pollutant is more soluble in the organic solvent than in water;
said boiling point of the solvent is less than a boiling point of the pollutant, the boiling point of the solvent being in a range of from about 60° C. to about 200° C.; and
said process further includes recovering the organic solvent from said first and second recovered portions of said liquid phase.

19. The treatment process according to claim 18, wherein the solvent consists essentially of a member chosen from the group consisting of: toluene, xylene, ligroine and a hydrocarbon fraction having a boiling point range of from about 80°0 C. to about 160° C.

20. The process according to claim 19, wherein:
the pollutant substantially comprises a member chosen from the group consisting of: oil, grease, aliphatic hydrocarbons, aromatic hydrocarbons, phenols, chlorinated hydrocarbons, pesticides, insecticides, TAK, PCG and PCDM;
the material comprises at least one of: sludge, construction debris, manufacturing debris, soil, sand and oil trap sludge;
said solvent is of a type that forms an azeotrope with water, and said treatment process further comprises the additional step of subjecting said liquid phase and solid phase mixture to an azeotrope distillation step to thereby distill off an azeotrope fraction from said liquid phase and solid phase mixture, said azeotrope fraction containing a substantial portion of the water in a solvent-water azeotrope, and said liquid phase in said liquid phase solid phase mixture, after said azeotrope distillation, containing substantially solvent;
said process further comprises the additional step of combining said environmentally safely disposable solid portion with a water binding additive, said water binding additive comprising a member chosen from the group consisting of: cement, gypsum, hydrated lime and anhydrite;
said further recovery treatment comprises subjecting said mechanically separated solid residue to a process for removing a substantial portion of said residual amount of said liquid phase, said process being chosen from the group consisting of:
passing air through said mechanically separated solid residue;
heating said mechanically separated solid residue;
evaporating said substantial portion of said residual amount of said liquid phase from said mechanically separated solid residue;
heating said mechanically separated solid residue under vacuum; and
evaporating said substantial portion of said residual amount of said liquid phase from said mechanically separated solid residue under vacuum.

* * * * *

UNITED STATES PATENT AND TRADEMARK OFFICE
CERTIFICATE OF CORRECTION

PATENT NO. : 5,296,040
DATED : March 22, 1994
INVENTOR(S) : Herbert DYBUS and Otto FUNK It is certified that error appears in the above-indentified patent and that said Letters Patent is hereby corrected as shown below:

In column 5, line 62, after 'residue', delete "4-s" and insert --is--.

In column 12, line 2, Claim 13, after 'an', delete "axeotropic" and insert --azeotropic--.

In column 14, line 25, Claim 20, after 'TAK,', delete "PCG" and insert --PCB--.

In column 14, line 32, Claim 20, after 'an', delete "azeotrope" and insert --azeotropic--.

In column 14, line 38, Claim 20, after 'said', delete "azeotrope" and insert --azeotropic--.

Signed and Sealed this

Third Day of December, 1996

Attest:

BRUCE LEHMAN

Attesting Officer        Commissioner of Patents and Trademarks